United States Patent
Whitney et al.

(10) Patent No.: US 12,134,359 B2
(45) Date of Patent: Nov. 5, 2024

(54) VEHICLE NOISE VIBRATION REDUCTION STRUCTURE

(71) Applicant: TOYOTA MOTOR ENGINEERING & MANUFACTURING NORTH AMERICA, INC., Plano, TX (US)

(72) Inventors: Arthur Henry Whitney, Fenton, MI (US); Christopher Paul Sheehy, Ypsilanti, MI (US); Luke W. Garnaut, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 326 days.

(21) Appl. No.: 17/588,063

(22) Filed: Jan. 28, 2022

(65) Prior Publication Data
US 2023/0242050 A1  Aug. 3, 2023

(51) Int. Cl.
*B62D 25/04* (2006.01)
*B60R 13/08* (2006.01)
*B62D 21/15* (2006.01)
*B62D 25/02* (2006.01)
*B62D 27/02* (2006.01)

(52) U.S. Cl.
CPC ............ *B60R 13/08* (2013.01); *B62D 21/157* (2013.01); *B62D 25/025* (2013.01); *B62D 25/04* (2013.01); *B62D 27/023* (2013.01)

(58) Field of Classification Search
CPC .... B62D 25/025; B62D 25/04; B62D 27/023; B62D 21/157
USPC ................... 296/193.06, 29, 30, 187.12, 209
See application file for complete search history.

(56) References Cited

U.S. PATENT DOCUMENTS

| | | | | |
|---|---|---|---|---|
| 8,491,046 B2 * | 7/2013 | Nagai | ................... | B62D 25/02 |
| | | | | 296/193.06 |
| 11,161,551 B2 * | 11/2021 | Honko | ................. | B62D 25/025 |
| 2006/0082179 A1 | 4/2006 | Depue | | |

FOREIGN PATENT DOCUMENTS

| | | | | |
|---|---|---|---|---|
| CN | 210116560 U | 2/2020 | | |
| CN | 213008378 U | 4/2021 | | |
| JP | 6137096 B2 * | 5/2017 | ........... | B62D 21/152 |
| KR | 100666542 B1 | 1/2007 | | |
| KR | 20120108609 A | 10/2012 | | |
| KR | 101666534 B1 | 10/2016 | | |

OTHER PUBLICATIONS

Text JP6137096 (Year: 2017).*

* cited by examiner

*Primary Examiner* — Dennis H Pedder
(74) *Attorney, Agent, or Firm* — SHEPPARD, MULLIN, RICHTER & HAMPTON LLP; Daniel N. Yannuzzi

(57) ABSTRACT

Systems and methods are provided related to a brace applied to a vehicle b-pillar. The brace may achieved reduced noise and vibration in the vehicle cabin. The brace may also achieve improved safety by preserving increased survival space for a passenger seated near the b-pillar in a side impact collision. The brace may include a base portion and two legs connected to the base portion at opposing sides. The based portion may include a first edge connected to a first side of the b-pillar and a second edge connected to a second side of the b-pillar. The legs may each connected a rocker at a distal portion. The shape of the brace may enable routing of force, energy, and/or load from the b-pillar to the rocker via the base portion and legs.

20 Claims, 3 Drawing Sheets

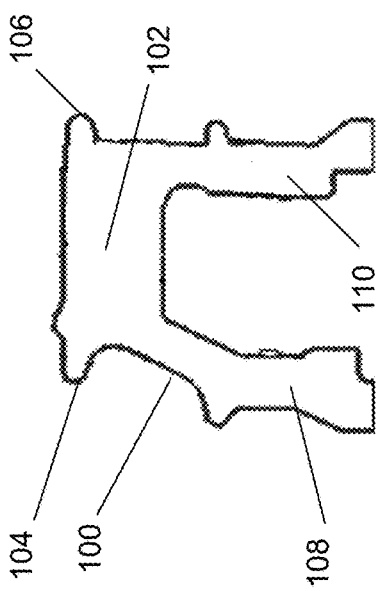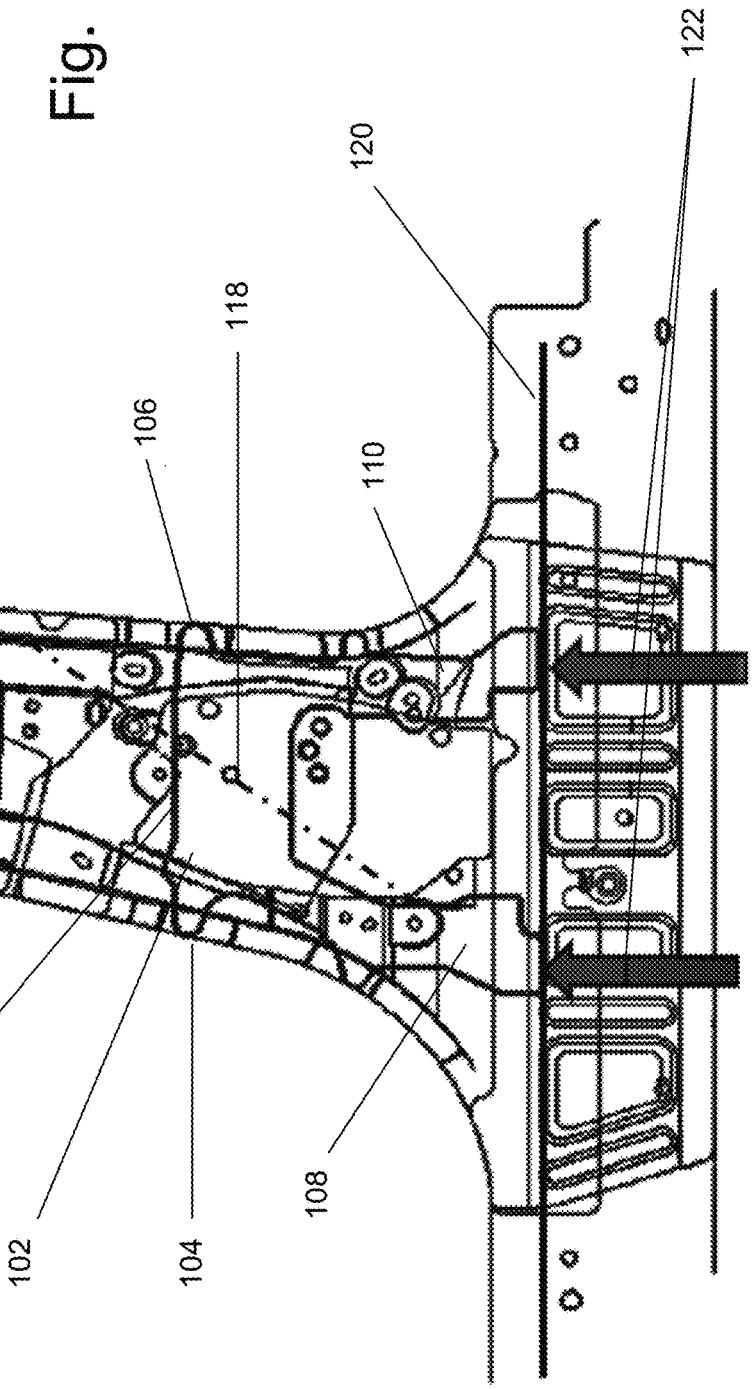

VEHICLE NOISE VIBRATION REDUCTION STRUCTURE

TECHNICAL FIELD

The present disclosure relates generally to systems and methods for noise and vibration improvement and impact safety improvement in vehicles. In particular, some implementations may relate to a noise and vibration reducing brace configured within the B-pillar of a vehicle.

DESCRIPTION OF RELATED ART

Vehicle employ a wide variety of engines which contribute noise and vibration in the cabin and/or body of the vehicle. Increased cabin noise and vibration can be disruptive, unpleasant, and unsafe for drivers and passengers in the vehicle.

Vehicles typically contain a B-pillar providing support in the mid-section of the vehicle. Upon impact, traditional B-pillars can bend. When B-pillars bend during impact, the bending can reduce the amount of space protecting vehicle passengers from impact. Bending puts passengers at risk of severe injury during impact.

BRIEF SUMMARY OF THE DISCLOSURE

According to various embodiments of the disclosed technology a brace may include a base portion. The base portion may include a first edge. The first edge of the base portion may have a configuration that enables coupling of the first edge to a first side of a vehicle pillar. The base portion may also include a second edge. The second edge may be opposite the first edge. The second edge may have a configuration that enables coupling of the second edge to a second side of the vehicle pillar. A brace may also include a first leg portion. The first leg portion may include a proximal end. The proximal end of the first leg portion may be connected to the base portion. The first leg portion may also include a distal end. The distal end may have a configuration that enables coupling of the distal end to a vehicle rocker panel. The brace may also include a second leg portion. The second leg portion may include a proximal end. The proximal end of the second leg portion may be connected to the base portion opposite the first leg portion. The second leg portion may also include a distal end. The distal end may have a configuration that enables coupling of the distal end to the vehicle rocker panel.

A brace may substantially form an inverted u-shape. The brace may be configured in the B-pillar of a vehicle. Application of the brace to the B-pillar of a vehicle may achieve noise and vibration reduction in the vehicle cabin. Application of the brace to the B-pillar of the vehicle may also achieve increased preservation of survival space for a passenger seated near the B-pillar.

A B-pillar stabilizing method may include stabilizing the B-pillar using a brace. The brace may include a base portion. The base portion may have a first edge secured to a first side of the B-pillar. The base portion may also have a second edge secured to a second side of the B-pillar. The brace may also have a first leg. The first leg may be connected to the base portion at a proximal end of the first leg and the first leg may be connected to a rocker at the distal portion of the first leg. The brace may also have a second leg. The second leg may be connected to the base portion at a proximal end of the second leg. The second leg may be connected to the rocker at a distal portion of the second leg. The stabilizing method may also include directed energy from the B-pillar to the rocker using the brace. The redirection of energy using the brace may reduce bending of the B-pillar about its y-axis.

In the stabilizing method, energy affecting the B-pillar may be generated by the vehicle engine. The brace may achieve a reduction of noise generated by the vehicle engine of about 1 decibel. In the stabilizing method, energy affecting the B-pillar may be transferred to the B-pillar during a side-impact collision. The stabilizing method may also include preserving survival space for a passenger seated near the B-pillar. The improvement in preserved survival space may be about 30 millimeters.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 1A shows an example of a noise and vibration reducing brace configured in a B-pillar.

FIG. 1B shows an example of a noise and vibration reducing brace.

Figure 2B:
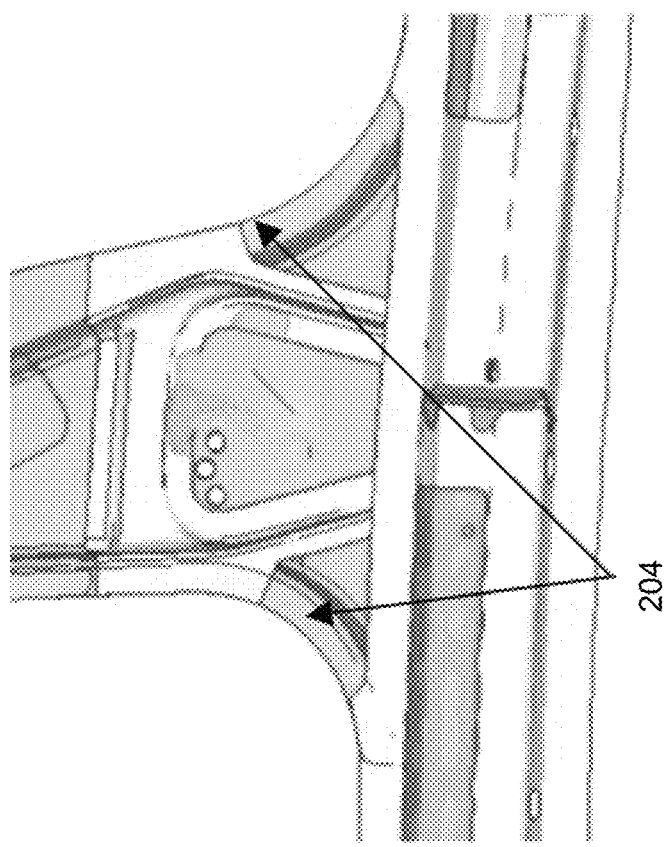
FIG. 2B shows an example of a noise and vibration reducing brace configured in a B-pillar.

The figures are not exhaustive and do not limit the present disclosure to the precise form disclosed.

DETAILED DESCRIPTION

Embodiments of the systems and methods disclosed herein can provide improvements in both cabin noise and vibration reduction and vehicle side impact safety through use of a specialized brace. Specifically, the embodiments disclosed herein are directed to a specialized brace that may be configured within the B-pillar of a vehicle.

Vehicles may use a wide range of engines to propel the vehicle. Target noise and vibration improvement thresholds may be desired for the body for all of the engine vibration zones. In some embodiments, the brace may be designed to reduce noise and vibration in the cabin and or body of the vehicle. In an embodiment, the brace disclosed herein may achieve about 70% of the target for noise and vibration improvement, although other levels of improvement can be achieved. In an embodiment, the brace disclosed herein may achieve about a 1 decibel reduction in cabin noise, noise reduction of 0.25 to 3 db can be achieved.

In some embodiments, the brace may be designed to reduce bending of the B-pillar during a side impact of the vehicle. Reducing bending of the B-pillar may preserve more space for passengers in the vehicle which may improve passenger safety during impact. In an embodiment, the brace may achieve an increased survival space of about 30 millimeters. In other embodiments, survival space increases of 10 mm-50 mm may be achieved.

The specialized brace may be coupled to a vehicle's B-pillar. The brace may include a base portion. The brace may also include a first leg and a second leg. The base, first leg and second leg may be separate, connected structures, or the specialized brace may be a single, unitary structure. The first leg and the second leg may be contiguous with and connected to the base portion. The first leg may be connected to the base portion at a first side of the base portion. The second leg may be connected to the base portion at a second side of the base portion. The configuration of the legs and base portion may form an inverted U-shape.

The base portion may include a first edge. The base portion may include a second edge opposite the first edge. The first edge may be coupled to a first side of the B-pillar. The second edge may be coupled to a second side of the B-pillar. Each of the first and second legs may include a proximal portion and a distal portion. Each of the first and second legs may be connected to the base portion at the proximal portions of the first and second legs. The distal portions of the first and second legs may be connected to a vehicle's rocker panel. Each of the first and second legs may have a tapered shape.

During a side impact collision to the vehicle, the shape and structure of the brace may transfer the force of the impact to the rocker panels of the vehicle. Transferring the force to the rocker panels may prevent the B-pillar from experiencing the full force of the impact and may prevent the B-pillar from bending, or minimize the amount of bending, during the impact. Preventing bending of the B-pillar may increase the amount of survival space available for a passenger during a collision.

FIGS. 1A and 1B show examples of a brace consistent with embodiments described herein. As shown in FIG. 1A, a brace 100, may be configured within a B-pillar 112 of a vehicle. FIG. 1B shows an isolated example of a brace 100 for clarity. As shown in FIG. 1A, the B-pillar may have a first side 114 and a second side 116. A rocker 120 may lie perpendicular to the B-pillar 112 at the bottom of the B-pillar 112. As shown in FIGS. 1A and 1B, the brace 100 may have a base portion 102. The base portion 102 may have a first edge 104. As shown in FIG. 1A, the first edge 104 of the base portion 102 may be connected to the first side 114 of the B-pillar 112. The base portion 102 may have a second edge 106 opposite the first edge 104. The second edge 106 of the base portion 102 may be connected to the second side 116 of the B-pillar 112.

As shown in FIGS. 1A and 1B, the brace 100 may also have a first leg 108 and a second leg 110. Each of the first and second legs 108, 110 may be connected to and contiguous with the base portion 102. The first leg 108 may be opposite the second leg 110. Each of the first and second legs 108, 110 may have a proximal portion and a distal portion. Each of the first and second legs 108, 110 may be connected to the base portion 102 at the proximal portions of the legs 108, 110. As shown in FIG. 1A, the distal portions of each of the legs 108, 110 may contact the rocker 120 of a vehicle.

When a vehicle undergoes impact, for example, during a side collision, the brace 100, as described in the preceding paragraphs, may redirect the force of the impact from the B-pillar 112 to the rocker 120. The force may be transferred to the rocker 122 through each of the legs 108, 110. FIG. 1A illustrated the load 122 transferred to the rocker through the brace 100. Transferring the force of the impact to the rocker 120, via the brace 100, may reduce or eliminate bending of the B-pillar 112 during impact. Without the brace 100, a B-pillar may rotate about its y-axis 118 as a result of sustaining impact during a side collision. However, with the brace 100, the B-pillar may be sufficiently supported, given the load transfer to the rocker 120, to avoid bending. Avoiding bending increases the amount of survival space available to a passenger in the vehicle near the B-pillar.

In addition to strengthening the B-pillar's resistance against impact, the brace may also provide general increased stability to the B-pillar. While a vehicle is in operation, noise and vibration from the engine may carry through the cabin creating an uncomfortable environment for the driver and passengers. By stabilizing the B-pillar, the brace may also reduce noise and vibration from the engine creating a more comfortable driving experience. The noise reduction achieved by using the brace may be about 1 decibel.

Figure 2A:
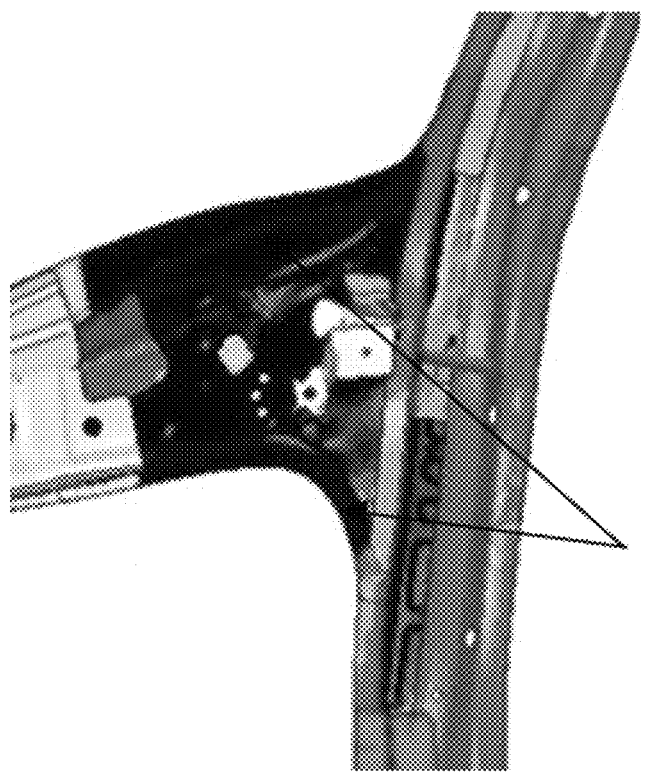
FIG. 2A shows an example of a B-pillar without a noise and vibration reducing brace.

FIGS. 2A and 2B show examples of a B-pillar with and without a brace, as described above in reference to FIGS. 1A and 1B. As shown in FIG. 2A, a B-pillar without a brace may rotate about its y-axis during impact from a side collision which may bend the B-pillar, reducing survival space available to passengers. FIG. 2A shows bent portions 202 of a B-pillar without a brace. As shown in FIG. 2B, a brace may stabilize a B-pillar and reduce or eliminate bending of the B-pillar about its y-axis during impact from a side collision, which may preserve additional survival space for passengers. FIG. 2B shows unbent portions 204 of the B-pillar which, without the stabilizing provided by the brace, may have bent during impact.

Figure 3:
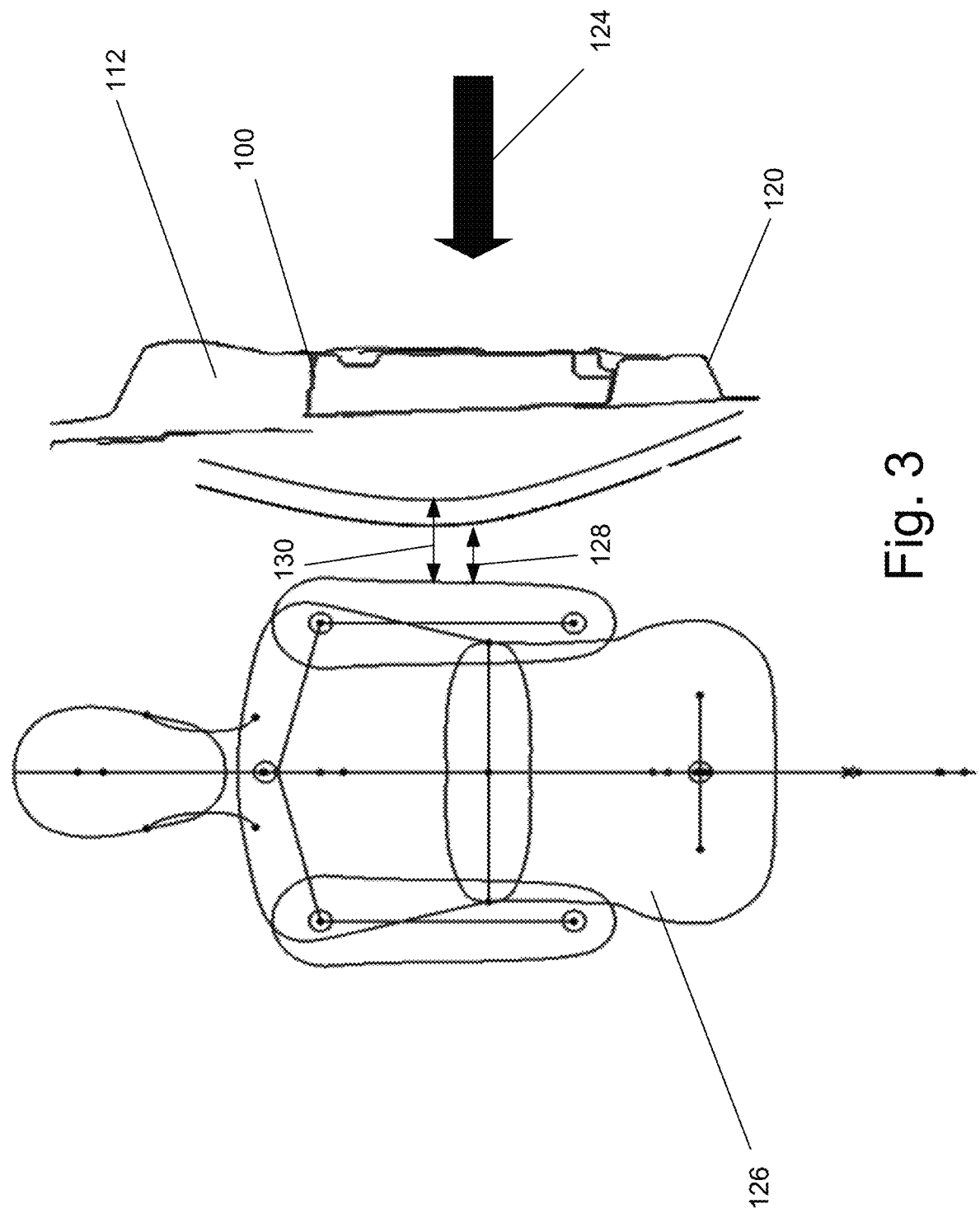
FIG. 3 shows an example of a side view of a noise and vibration reducing brace configured in a B-pillar.

FIG. 3 shows an example of a side view of a brace 100 configured within a B-pillar 112 of a vehicle. As described with reference to FIG. 1A, the brace 100 distributed the force from a side impact 124 to the rocker 120. The distribution of force may protect a passenger 126 sitting near the B-pillar 112 during a side impact collision. A first survival space 128 preserved for a passenger 126 without use of a brace 100 is shown relative to a second survival space 130 preserved for a passenger 126 with the use of the brace. The difference between the first survival space 128 and second survival space 130 may be about 30 millimeters.

The systems and methods disclosed herein may be implemented with any of a number of different vehicles and vehicle types. For example, the systems and methods disclosed herein may be used with automobiles, trucks, recreational vehicles and other like on- or off-road vehicles. The brace may be built into new vehicles to provide for increased stability of the B-pillar which contributes to increased safety during a collision and noise and vibration reduction during driving. Additionally and/or alternatively, the brace may be retrofitted into B-pillars of existing vehicles to achieve improved safety and noise and vibration reduction.

The above embodiments are described specifically with reference to a B-pillar of a vehicle. However, this description is in no way intended to limit the scope or implementation of the embodiments described herein. The brace may be implemented equally into other pillars and/or portions of a vehicle to achieve improved safety and noise and vibration reductions consistent with the above disclosure.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

The terms "substantially" and "about" used throughout this disclosure, including the claims, are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A brace comprising:
    a base portion, the base portion comprising:
        a first edge, the first edge having a configuration that enables coupling of the first edge to a first side of a pillar of a vehicle; and
        a second edge opposite the first edge, the second edge having a configuration that enables coupling of the second edge to a second side of the pillar of the vehicle;
    a first leg portion, the first leg portion comprising:
        a first proximal end connected to the base portion; and
        a first distal end having a configuration that enables coupling of the first distal end to a vehicle rocker panel; and
    a second leg portion, the second leg portion comprising:
        a second proximal end connected to the base portion opposite the first leg portion; and
        a second distal end having a configuration that enables coupling of the second distal end to the vehicle rocker panel,
    wherein the brace forms an inverted u-shape.

2. The brace of claim 1, wherein the brace is configured in the pillar of the vehicle.

3. The brace of claim 1, wherein application of the brace to the pillar of the vehicle achieves reduced noise and vibration in a cabin of the vehicle.

4. The brace of claim 1, wherein application of the brace to the pillar of the vehicle achieves increased preservation of survival space for a passenger seated near the pillar.

5. A pillar stabilization method comprising:
    stabilizing the pillar of a vehicle using a brace, the brace comprising:
        a base portion, the base portion having a first edge secured to a first side of the pillar and the base portion having a second edge secured to a second side of the pillar;
        a first leg, the first leg connected to the base portion at a first proximal end of the first leg and the first leg connected to a rocker at a first distal portion of the first leg; and
        a second leg, the second leg connected to the base portion at a second proximal end of the second leg and the second leg connected to the rocker at a second distal portion of the second leg;
        wherein the brace forms an inverted u-shape; and
    directing energy from the pillar to the rocker using the brace, wherein redirection of energy using the brace reduces bending of the pillar about its y-axis.

6. The method of claim 5, wherein the energy affecting the pillar is generated by a vehicle engine.

7. The method of claim 6, wherein the brace achieves a reduction of noise generated by the vehicle engine of about 1 decibel.

8. The method of claim 5, wherein the energy affecting the pillar is transferred to the rocker during a side-impact collision.

9. The method of claim 5, further comprising increasing preservation of survival space for a passenger seated near the pillar.

10. The method of claim 9, wherein the increased preservation of survival space is about 30 millimeters.

11. The brace of claim 1, wherein application of the brace to the pillar of the vehicle is used to direct energy from the pillar of the vehicle to the vehicle rocker panel.

12. The brace of claim 11, wherein redirection of energy using the brace reduces bending of the pillar of the vehicle about its y-axis.

13. The brace of claim 11, wherein the energy affecting the pillar is generated by an engine of the vehicle.

14. The brace of claim 3, wherein the noise reduction is between 0.25 to 3 decibel.

15. The brace of claim 13, wherein the energy affecting the pillar is transferred to the vehicle rocker panel during a side-impact collision.

16. The brace of claim 4, wherein the increased preservation of survival space is between 10 to 50 millimeters.

17. The brace of claim 1, wherein the first and second leg portions each further comprise a tapered shape.

18. The brace of claim 1, wherein the pillar of the vehicle comprises at least one of an A-pillar, B-pillar, C-pillar, or D-pillar of the vehicle.

19. The method of claim 5, wherein the brace is configured in the pillar of the vehicle.

20. The method of claim 5, wherein the first and second legs each further comprise a tapered shape.

* * * * *